Patented Apr. 16, 1935

1,998,404

UNITED STATES PATENT OFFICE 1,998,404

PRODUCTION OF POLYMERS OF KETENE

Peter J. Wiezevich and Anthony H. Gleason, Elizabeth, N. J., assignors to Standard Oil Development Company, a corporation of Delaware No Drawing. Application August 28, 1931, Serial No. 559,936

12 Claims. (Cl. 260—131)

This invention relates to the preparation of polymers of ketene ($CH_2=CO$). More particularly it relates to the preparation of the dimer of ketene, cyclobutane 1,3 dione, and the utilization of the polymer in the manufacture of commercial products.

It is known that ketene will polymerize to give various products among which are cyclobutane 1,3 dione, which is believed to possess the formula $(CH_2=CO)_2$, dehydroacetic acid, tars, etc. but so far no practical method has been available for obtaining high yields of the cyclobutane 1,3 dione.

In the present invention this is accomplished by subjecting ketene to pressures higher than atmospheric such as 2 to 200 atmospheres and under suitable conditions. It has been found preferable to allow the compressed ketene to stand in contact with a metallic surface at moderately low temperatures. As an example, ketene formed by the pyrolysis of acetone, was separated from acetone by cooling with solid carbon dioxide-alcohol mixture, liquefied by cooling with liquid air, introduced into a steel bomb and allowed to warm up to room temperature under its own pressure. After standing approximately 8 to 12 hours, the products of the bomb contained cyclobutane 1,3 dione corresponding to a yield of 85% of the theoretical yield. Other metals such as copper, chrome nickel steel, etc., may be employed. The ketene, instead of being liquefied by cooling, as in the example given, may be compressed into the metal container by a compresser or the like at a temperature of about 0° C. to 100° C.

The cyclobutane 1,3 dione (boiling point being about 127° C.) so prepared, may be considered as the anhydride of aceto-acetic acid since it reacts with water to give aceto-acetic acid, and under suitable conditions may be made to react with various other compounds. As an example, cyclic and/or aliphatic hydroxy compounds were heated at moderate temperatures such as approximately 25° C. to less than 127° C. with cyclobutane 1,3 dione, preferably in the presence of small amounts of catalysts, for example mineral acids such as hydrochloric acid, etc. or metallic salts such as sodium bisulfate, etc., to give esters known as aceto-acetates. If the reaction is performed under pressures greater than atmospheric, temperatures higher than 127° C. may be employed. A yield of 80 to 85 per cent of aceto-acetic ester of ethyl alcohol was obtained in this manner. Similarly, aceto-acetic esters of other aliphatic alcohols, including the di- and tri-hydric alcohols, may be prepared. Phenyl aceto-acetate has also been prepared in a similar manner from phenol with satisfactory yield. Other phenolic or aromatic hydroxy compounds, such as the xylols and cresols, may also be used. Cellulose ester films were also prepared by treating activated cellulose with the ketene polymer, cyclo-butane 1,3 dione, in the presence of an inert solvent, such as acetone, chloroform, etc.

The foregoing description is merely illustrative and various changes and alternative arrangements may be made within the scope of the appended claims in which it is our intention to claim all novelty inherent in the invention as broadly as the prior art permits.

We claim:
1. The method of preparing valuable products from ketene, which comprises contacting it with a metallic surface promoting polymerization of the ketene.
2. Method according to claim 1, carried out at superatmospheric pressure.
3. Method according to claim 1, carried out at a pressure between the approximate limits of 2 and 200 atmospheres.
4. Method according to claim 1, carried out at a temperature below about 100° C.
5. Method according to claim 1, carried out at a temperature between the approximate limits of 0° and 100° C.
6. Method according to claim 1, in which the polymerization promoter is a metal of the group consisting of steel, chrome nickel steel and copper.
7. Method according to claim 1, in which the metallic surface promoting polymerization is steel.
8. Method according to claim 1, carried out in a steel container.
9. Method of preparing polymers of ketene, which comprises contacting it with copper.
10. Method of preparing cyclobutane 1,3 dione, which comprises contacting ketene with a metallic surface promoting polymerization thereof.
11. Method of preparing cyclobutane 1,3 dione, which comprises subjecting ketene to a superatmospheric pressure in the presence of a metallic surface promoting polymerization of said ketene.
12. Method of preparing valuable products from ketene, which comprises liquefying the ketene by a cooling medium, introducing said liquid ketene into a steel bomb, allowing it to warm up to room temperature under its own pressure and holding it under such pressure until substantial polymerization has occurred.

PETER J. WIEZEVICH.
ANTHONY H. GLEASON.